United States Patent
Tate et al.

(10) Patent No.: US 7,266,860 B2
(45) Date of Patent: Sep. 11, 2007

(54) BLOWER-VACUUM DEVICES

(75) Inventors: Clare Tate, Newton Aycliffe (GB); John Sadler, Darlington (GB)

(73) Assignee: Black & Decker Inc., Newark, DE (US)

( * ) Notice: Subject to any disclaimer, the term of this patent is extended or adjusted under 35 U.S.C. 154(b) by 647 days.

(21) Appl. No.: 10/742,287

(22) Filed: Dec. 22, 2003

(65) Prior Publication Data

US 2004/0187252 A1 Sep. 30, 2004

(30) Foreign Application Priority Data

Dec. 19, 2002 (GB) .................... 0229517.8

(51) Int. Cl.
*E01H 1/08* (2006.01)
(52) U.S. Cl. .......................... 15/330; 15/344
(58) Field of Classification Search ............ 15/328, 15/330, 344, 405
See application file for complete search history.

(56) References Cited

U.S. PATENT DOCUMENTS 5,604,954 A * 2/1997 Webster et al. ............... 15/330
5,659,920 A * 8/1997 Webster et al. ............... 15/344

* cited by examiner

Primary Examiner—Terrence R. Till
(74) Attorney, Agent, or Firm—John Yun; Bruce S. Shapiro; Wesley Muller

(57) ABSTRACT

The present invention provides a blower-vacuum device with both a blowing mode of operation and a vacuuming mode of operation and having dirty fan operation in the vacuuming mode thereof, which comprises: a hand-holdable unit (10) comprising a motor having an output shaft extending outwardly of said hand-holdable unit; an impeller connected to said output shaft; a first attachment (22, 24, 26, 28) for removable engagement with the hand-holdable unit (10) in the vacuuming mode of operation and comprising both a first volute (22) for enclosing said impeller and a vacuum tube (26) in fluid communication with an inlet of said first volute; a second attachment (16, 18, 20) for removable engagement with the hand-holdable unit (10) in the blowing mode of operation and comprising both a second volute (16) for enclosing said impeller and a blower tube (20) in fluid communication with an outlet of said second volute; wherein the first attachment further comprises a handle (24) on or proximal to said first volute; and the blower tube (20) of the second attachment is coplanar with the second volute (16). Thus the impeller is always easily accessible for cleaning if it becomes clogged with garden waste, the blower-vacuum device may be operated with only one hand in blowing mode and two hands in vacuuming mode and air from the second volute (16) can pass freely down the blower tube (20) without encountering any sharp turns.

7 Claims, 3 Drawing Sheets

BLOWER-VACUUM DEVICES

The present invention concerns blower-vacuum devices, commonly referred to as blowervacs, which are typically used for collecting garden waste, such as leaves, grass cuttings and twigs. More particularly, the present invention concerns blowervacs having a vacuuming mode of operation with a dirty fan. The meaning of the term "dirty fan" will be explained in detail below.

Blowervacs generally comprise a motor having an output shaft connected to a fan. The motor is usually either petrol or electrically powered. The fan is enclosed within a chamber called a volute and is configured to draw air in along its axis of rotation and expel air out tangentially when the fan is driven by the motor. Fans having such a configuration are properly called impellers. The interior of the volute is shaped to enable the flow of air generated by the fan in operation. Accordingly, the volute is in essence disc-shaped and is provided with both an inlet generally aligned with the impeller's axis of rotation and at least one outlet located at a point on the periphery of the volute.

As their name implies, blowervacs have two modes of operation: blowing and vacuuming. In the blowing mode of operation, clean air is drawn into the volute from the atmosphere via the inlet thereto and is expelled via the outlet. A blower tube is attached to the outlet in order to concentrate and direct the expelled air into a jet, which may be aimed in different directions by pointing the blower tube as desired. In the vacuuming mode of operation, garden waste may be collected up a vacuum tube connected to the blowervac in one of two ways, usually known as clean fan and dirty fan operation. In clean fan operation of a blowervac in vacuuming mode, clean air is drawn into the volute from the atmosphere via the inlet thereto in the same manner as for blowing operation and the air expelled from the volute through the outlet thereof is directed towards a collection device or receptacle. The receptacle is porous to the passage of air therethrough and is also fed by the vacuum tube with air from ground level. Air passing into the receptacle from the volute therefore causes air to be sucked up the vacuum tube as well. Garden waste entrained with the air passing up the vacuum tube is collected in the receptacle without passing through the fan; hence, clean fan operation. In contrast, in dirty fan operation, an air-porous receptable for garden waste is attached directly to the outlet from the volute and the vacuum tube is instead attached to the inlet thereto. In this latter case, garden waste entrained with air passing up the vacuum tube enters the volute via the inlet thereto and collides with the fan, before being expelled via the outlet of the volute into the receptacle; hence, dirty fan operation. Collision of the garden waste with the fan causes the fan to mulch the garden waste into smaller particles. Since garden waste mulched in this fashion contains far fewer air pockets than unmulched garden waste, the volume ratio of unmulched to mulched garden waste can be as much as 10:1. Dirty fan operation is therefore generally far more preferable to clean fan operation of a blowervac in vacuuming mode because the garden waste receptacle can store a much larger mass of garden waste in the same volume once it has been mulched than of unmulched waste.

A conventional blowervac providing dirty fan operation in the vacuuming mode thereof is described in U.S. Pat. No. 5,535,479 assigned to The Toro Company. FIG. 3 of U.S. Pat. No. 5,535,479 shows the blowervac thereof in the blowing mode of operation and FIG. 4 of this patent document shows the blowervac thereof in the vacuuming mode of operation with a dirty fan. As may be seen by comparing these two figures, the blowing mode of operation requires the blower tube to be held at a shallower angle to the ground in order to blow garden waste along the ground than the vacuum tube is held at in the vacuuming mode of operation, where a steeper angle is more desirable in order to minimize the area of the ground over which the vacuum tube operates and therefore maximize the sucking force per unit area of ground. As may also be seen by comparing these two figures, the longitudinal axis of the blower tube in the blowing mode of operation is aligned at right angles to the vacuum tube in the vacuuming mode of operation, according to the locations of the inlet and outlet of the volute. In order to accommodate this rotation through 90 degrees between the two modes of operation, the handle 7 used in the blowing mode is no longer needed in the vacuuming mode and the vacuum tube 46 is provided with an additional handle 60 for use in the vacuuming mode of operation instead.

The blowervac described in U.S. Pat. No. 5,535,479 is generally convenient to use, but suffers from two main disadvantages as follows. Firstly, the impeller is permanently enclosed within the volute, so that if the volute becomes clogged with garden waste during use of the blowervac in the vacuuming mode of operation, access to the volute to unblock it and to clean the fan is difficult. Blowervacs can be particularly prone to clogging when used for collecting garden waste which is wet. Secondly, the presence of the additional handle 60 adds to the weight of the blowervac which must be borne by a user in the vacuuming mode of operation. Additional weight in the vacuuming mode of operation is particularly undesirable because the user must also bear the weight of the receptacle and of the garden waste collected therein, neither of which are present in the blowing mode of operation.

A second conventional blowervac providing dirty fan operation in the vacuuming mode thereof and which solves both of the above problems is described in European Patent No. 0 723 758 of Black & Decker Inc. FIG. 1 of European Patent No. 0 723 758 shows the blowervac thereof in the blowing mode of operation and FIG. 2 of this patent document shows the blowervac thereof in the vacuuming mode of operation with a dirty fan. FIG. 3 of this patent document shows an embodiment of the blowervac thereof convertible between a blowing mode of operation and a vacuuming mode of operation with a dirty fan. As may be seen from these three figures, the blowervac is provided with one or more different detachable volutes for use in the blowing and vacuuming modes of operation. The detachable volutes may be formed integrally with blowing and vacuum tubes as shown in FIGS. 1 and 2, respectively, of this document, or as a single detachable volute which may be used interchangably with separable blowing and vacuum tubes as shown in FIG. 3. However, in both cases, since the volute may be removed from around the fan, access to the fan is simple and both the fan and the volute can be cleaned with ease if they become clogged during use of the blowervac in the vacuuming mode of operation. Moreover, in all cases, the blowing and vacuum tubes are aligned such that only two handles (labelled 18 and 20 in FIG. 1, 118 and 120 in FIG. 2 and 118' and 120' in FIG. 3 of this document) are required to hold the blowervac in both blowing and vacuuming modes of operation. Both of the problems with the blowervac described in U.S. Pat. No. 5,535,479 are thereby solved. (The blowervac of European Patent No. 0 723 758 may also be operated in vacuuming mode with a clean fan, as shown in FIG. 4 thereof. However, this additional disclosure of European Patent No. 0 723 758 is irrelevant to the present invention.)

Although the blowervac of European Patent No. 0 723 758 successfully improves upon the blowervac of U.S. Pat. No. 5,535,479, the blowervac described in European Patent No. 0 723 758 still suffers from a disadvantage, as follows. In order that the blowing and vacuum tubes are aligned such that only two handles are required to hold this blowervac in both blowing and vacuuming modes of operation, the blower tube of this blowervac is aligned at right angles to the plane of the volutes used in the blowing mode of operation. Consequently, the blower tube has to comprise a sharp turn of approximately 90 degrees, which is not present in the blowervac of U.S. Pat. No. 5,535,479. This sharp turn is undesirable because it creates a loss of blowing power by generating turbulence, thereby reducing the effectiveness of the blowervac in the blowing mode of operation for a given power of motor.

The present invention addresses this problem. Accordingly, the present invention provides a blower-vacuum device with both a blowing mode of operation and a vacuuming mode of operation and having dirty fan operation in the vacuuming mode thereof, which comprises: a hand-holdable unit comprising a motor having an output shaft extending outwardly of said hand-holdable unit; an impeller connected to said output shaft; a first attachment for removable engagement with the hand-holdable unit in the vacuuming mode of operation and comprising both a first volute for enclosing said impeller and a vacuum tube in fluid communication with an inlet of said first volute; a second attachment for removable engagement with the hand-holdable unit in the blowing mode of operation and comprising both a second volute for enclosing said impeller and a blower tube in fluid communication with an outlet of said second volute; wherein the first attachment further comprises a handle on or proximal to said first volute; and the blower tube of the second attachment is coplanar with the second volute.

The presence of a handle on the first attachment of a blowervac according to the invention on or proximal to the first volute allows for two-handed operation of this blowervac in the vacuuming mode thereof in a similar manner to the blowervac of European Patent No. 0 723 758, thereby giving all of the advantages of the blowervac of European Patent No. 0 723 758 in the vacuuming mode of operation. However, since the blowervac of the invention differs from the blowervac of European Patent No. 0 723 758 in that this handle forms part of the first attachment rather than of the hand-holdable unit comprising the motor, when the first attachment is removed from the hand-holdable unit, this handle is removed as well. Accordingly, the hand-holdable unit in the blowervac of the invention may be rotated through approximately 90 degrees and a second attachment in which the blower tube is coplanar with the second volute may be engaged with the hand-holdable unit thereof for operation of the blowervac of the invention in the blowing mode thereof. Since in this second attachment the blower tube is coplanar with the second volute, the disadvantage with the blowervac of European Patent No. 0 723 758 that the blower tube must comprise a sharp turn of approximately 90 degrees is thereby overcome. In contrast, rotating the hand-holdable unit of the blowervac of European Patent No. 0 723 758 through approximately 90 degrees would cause handle 20, 120, 120' used in the vacuuming mode thereof either (a) to create an obstruction preventing engagement with the hand-holdable unit of an attachment in which the blower tube is coplanar with the volute or (b) to be located in an inaccessible position on the underside and at the rear of the hand-holdable unit, where it could no longer be used to hold the unit and would thus create additional unnecessary weight to be borne by a user in the blowing mode of operation.

Moreover, a blowervac according to the invention also has an additional benefit over the blowervac described in U.S. Pat. No. 5,535,479. This is because the blowervac of the invention has only one handle in the blowing mode of operation and two handles in the vacuuming mode, both of which are effective for use in the vacuuming mode. In contrast, the blowervac of U.S. Pat. No. 5,535,479 has two handles in the blowing mode of operation and three handles in the vacuuming mode thereof, one of which (handle 7) is ineffective for use in the vacuuming mode. The blowervac of the invention therefore has fewer handles in both the blowing and vacuuming modes of operation than the blowervac of U.S. Pat. No. 5,535,479 and is consequently lighter and easier to carry.

In a preferred embodiment of the blowervac according to the present invention, the second volute has a smaller interior volume than the first volute. This allows the weight of the second volute, which unlike the first volute, does not have to accommodate the passage of garden waste therethrough, to be minimized, thereby reducing the overall weight of the blowervac in blowing mode.

For ease of packaging, storage and transportation of the blowervac, the first attachment may be separable into a first portion comprising the first volute and a second portion comprising at least a part of the vacuum tube, and/or the second attachment may be separable into a first portion comprising the second volute and a second portion comprising at least a part of the blower tube. Thus the components of the blowervac may be disassembled and stored in a small overall volume.

Preferably, the hand-holdable unit comprises an interlock mechanism for preventing operation of the motor when neither the first attachment nor the second attachment is engaged therewith. This prevents a user from being injured by operation of the impeller when it is exposed. Such an interlock mechanism is described, for example, in European Patent No. 0 723 759 of Black & Decker Inc. Also to protect users from being injured by operation of the impeller, an outlet of the first volute may comprise an obstruction which allows the passage of mulched garden waste therethrough, but which prevents the insertion of a human finger into the first volute sufficiently far to contact the impeller. Whether or not a human finger can be inserted into the volute sufficiently far to contact the impeller may be tested according to safety standard UL-1017 of Underwriters' Laboratory Inc., details of which may be obtained from their UK subsidiary, UL International (UK) Ltd., at Wonersh House, The Guildway, Old Portsmouth Road, Guildford, Surrey, GU3 1LR, United Kingdom. If required, a similar obstruction may also be provided on an outlet of the second volute, for example if this outlet is exposed to a user by detachment of the blower tube from the second volute. In a preferred embodiment, the outlet of the first or second volute comprises a tube and the obstruction therein comprises one or more vanes formed on the inner surface of said tube and aligned with the longitudinal axis thereof. Such an embodiment has the advantage of preventing the insertion of a human finger into the volute, whilst also minimizing the resistance presented by the obstruction to the passage of air and possibly also garden waste through the outlet.

Preferably, the first attachment further comprises means for scraping garden waste from the ground located at the end of the vacuum tube remote from the first volute. This is particularly helpful in the collection of wet garden waste, which otherwise can be difficult to pick up with a blowervac by suction alone.

Finally, it is also preferable for the blowervac to comprise an air-porous receptacle for removable attachment to the outlet of the first volute. Thus, garden waste sucked up in the vacuum mode of operation can be collected in such a receptacle and deposited elsewhere by removing the receptacle, emptying it and replacing it as desired.

This and other features and advantages of the present invention will be better understood from the following detailed description, which is given by way of example and with reference to the accompanying drawings, in which.

Figure 1:
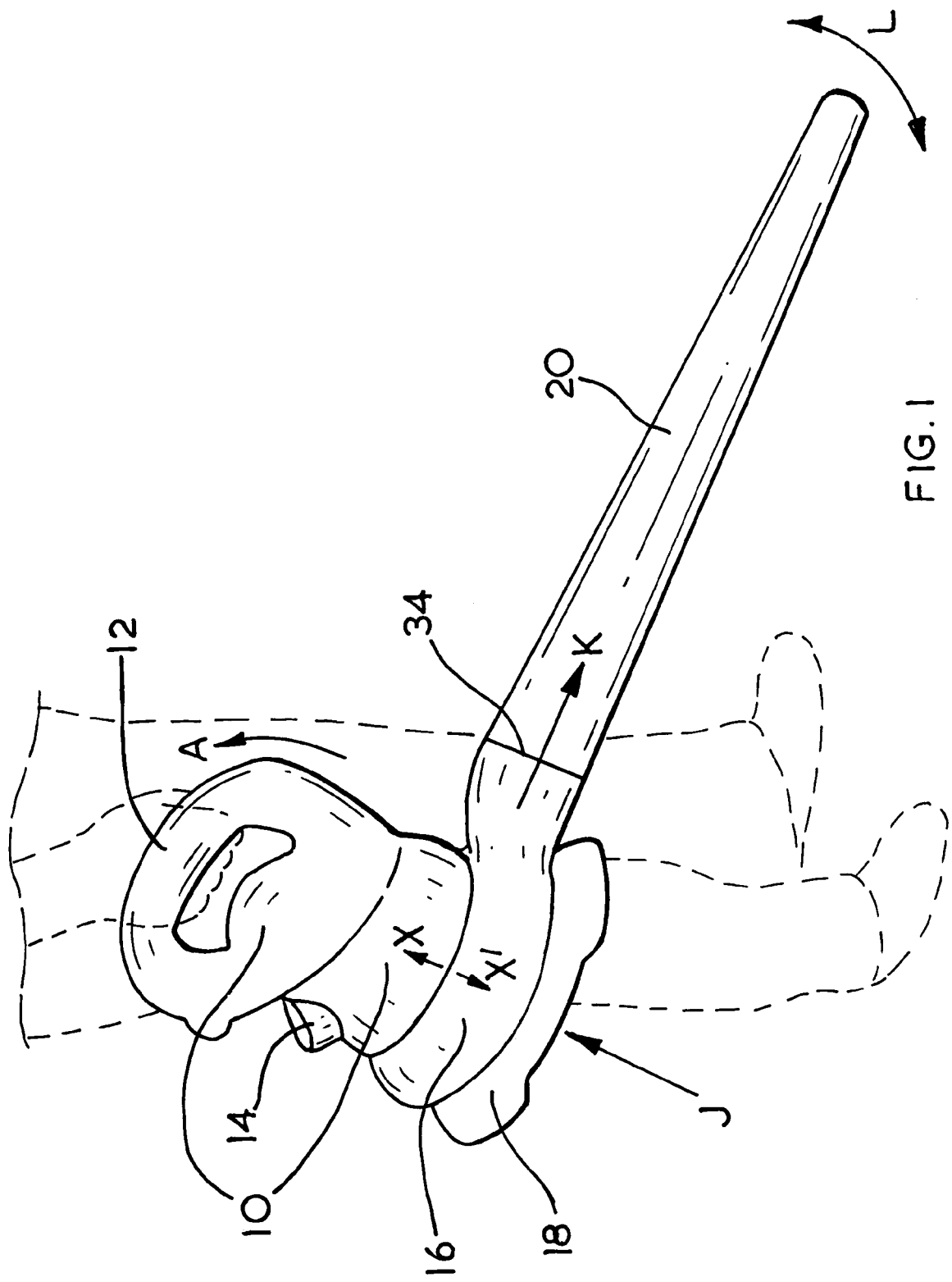
FIG. 1 shows a blowervac according to the invention in the blowing mode of operation.

Referring firstly to FIG. 1, there is shown a blowervac according to the invention in use in the blowing mode of operation, in which dashed lines represent the lower body portion of a user. As shown in FIG. 1, hand-holdable unit 10, which comprises a motor, has a handle 12 for grasping by the user and is also provided with a power inlet 14 for attachment of a cable to supply electrical power to the motor. In this mode of operation, the motor is oriented in a generally vertical direction and the output shaft of the motor extends downwardly of hand-holdable unit 10 into the interior of volute 16, which encloses an impeller connected to the output shaft (not shown in the drawings). In this orientation, air is drawn into volute 16 from the atmosphere in the direction indicated by arrow J through an inlet to volute 16 provided on the underside thereof and is expelled through an outlet of volute 16 in the direction indicated by arrow K down blower tube 20. As may be seen from FIG. 1, blower tube 20 is coplanar with volute 16, so that air from volute 16 can pass freely down blower tube 20 without encountering any sharp turns. Blower tube 20 is also slightly tapered towards its open end, in order to concentrate the air from volute 16 into a jet which is expelled from the open end of blower tube 20. This jet may be redirected by a user as desired by swinging the blowervac back and forth in a horizontal plane as indicated in FIG. 1 by double-headed arrow L. Volute 16 is detachable from hand-holdable unit 10 by pulling hand-holdable unit 10 and volute 16 in opposite directions, as indicated by arrows X and X', respectively. This allows hand-holdable unit 10 to be rotated through approximately 90 degrees in the direction indicated by arrow A for use of the blowervac in the vacuuming mode of operation shown in FIG. 2.

In the embodiment shown in FIG. 1, volute 16 is also provided with a base 18, which gives volute 16 some clearance on its underside and therefore allows the blowervac to be rested on a horizontal surface in the configuration shown in FIG. 1, without the risk of foreign bodies accidentally entering volute 16 through the inlet thereto. To further protect the inlet to volute 16, as well as to protect users from the impeller when it is in operation, the inlet to volute 16 is also covered by a grille, the spacing of which is smaller than to allow the insertion of a human finger according to safety standard UL-1017 of Underwriters' Laboratory Inc.

Figure 2:
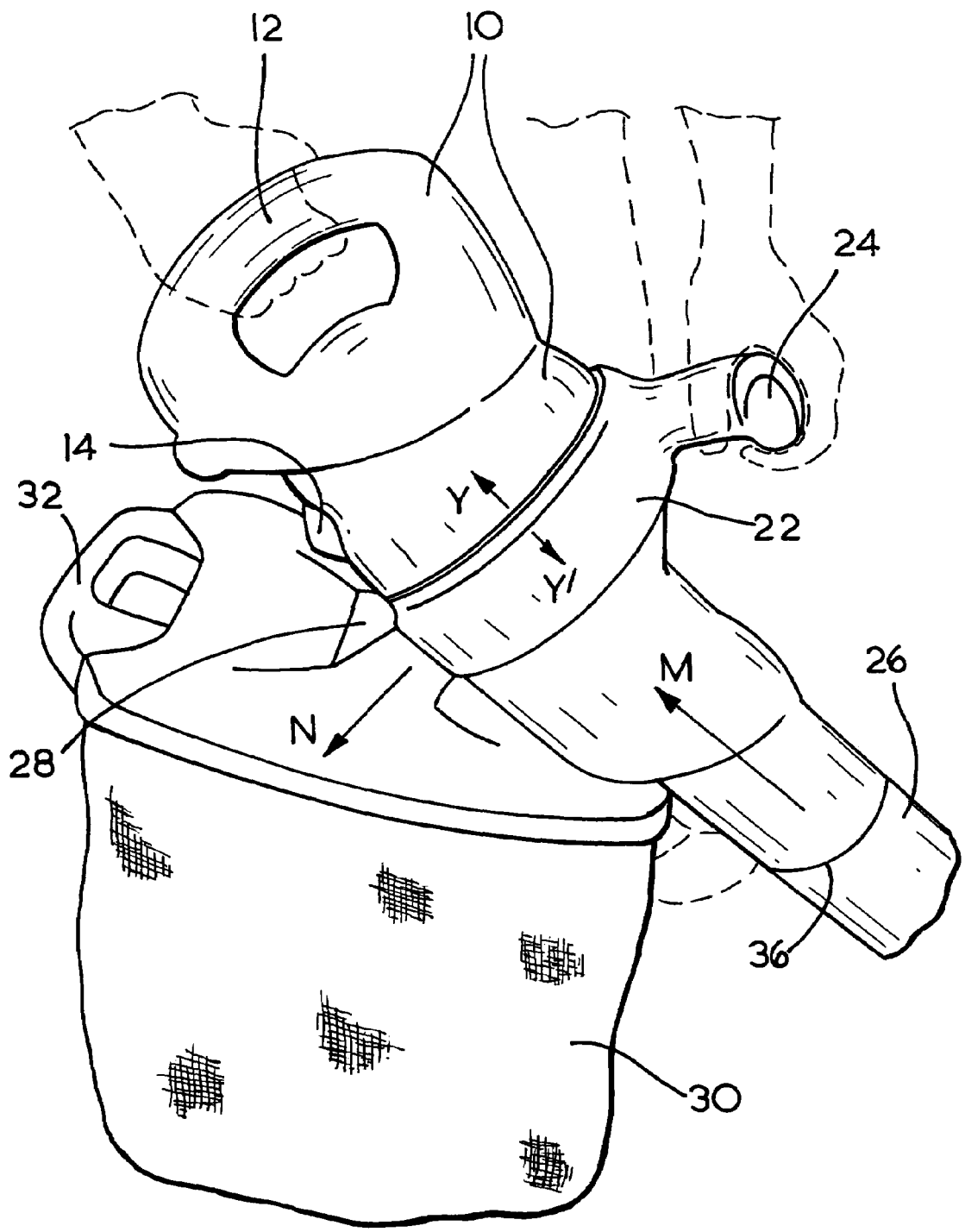
FIG. 2 shows a blowervac according to the invention in the vacuuming mode of operation with a dirty fan.

Referring next to FIG. 2, it may be seen that hand-holdable unit 10 is now attached to a different volute 22 having a handle 24. As shown in FIG. 2, this allows the blowervac to be held in two hands, where dashed lines again represent the lower body portion of a user. In this mode of operation, the motor is oriented in a more horizontal direction than that shown in FIG. 1 and the output shaft of the motor extends from hand-holdable unit 10 into the interior of volute 22. Like volute 16, volute 22 encloses the impeller connected to the output shaft of the motor. In this orientation, air and garden waste are drawn up vacuum tube 26 into volute 22 in the direction indicated by arrow M, where the garden waste collides with and is mulched by the impeller, before being ejected through outlet 28 of volute 22 in the direction indicated by arrow N. Volute 22 has a larger interior volume than volute 16 in order to accommodate garden waste with a reduced chance of clogging and is detachable from hand-holdable unit 10 by pulling hand-holdable unit 10 and volute 22 in opposite directions, as indicated in FIG. 2 by arrows Y and Y', respectively. This allows easy access to both the impeller and the interior of volute 22 for cleaning purposes in case they become clogged with garden waste. On the other hand, hand-holdable unit 10 comprises an interlock mechanism which prevents operation of the motor when neither volute 16 nor volute 22 is engaged with hand-holdable unit 10. Thus the impeller cannot be operated when it is exposed.

In the embodiment shown in FIG. 2, outlet 28 of volute 22 feeds directly into a nylon bag 30, which provides an air-porous receptacle for collecting garden waste once it has been mulched by the impeller. Bag 30 is further provided with a handle 32, allowing bag 30 to be removed from outlet 28, emptied and reattached, as required. Although not shown in FIG. 2, the interior of outlet 28 comprises a tube which extends into the interior of bag 30. The inner surface of this tube is provided with several rigid vanes aligned with the longitudinal axis of the tube. These form an obstruction allowing the passage of mulched garden waste therethrough, whilst also preventing a user from inserting a finger into volute 22 sufficiently far to contact the impeller, again as tested in accordance with safety standard UL-1017.

As shown in FIGS. 1 and 2, in this embodiment, blower tube 20 can be separated from volute 16 at the joint indicated by reference numeral 34 and vacuum tube 26 can be separated from volute 22 at the joint indicated by reference numeral 36. This allows the blowervac to be disassembled and stored without taking up a large amount of space. Joint 36 is located sufficiently far from volute 22 to make it impossible for a user to insert a finger into volute 22 through the inlet thereof when the impeller is running, as tested according to safety Standard UL-1017. On the other hand, since joint 34 is located closer to volute 16 than joint 36 is to volute 22, the outlet of volute 16 is provided with vanes on its inner surface similar to those provided on the interior of the tube inside outlet 28 of volute 22. These vanes therefore prevent a user from inserting a finger into volute 16 through the outlet thereof when the impeller is running, again as tested in accordance with safety Standard UL-1017.

Figure 3:
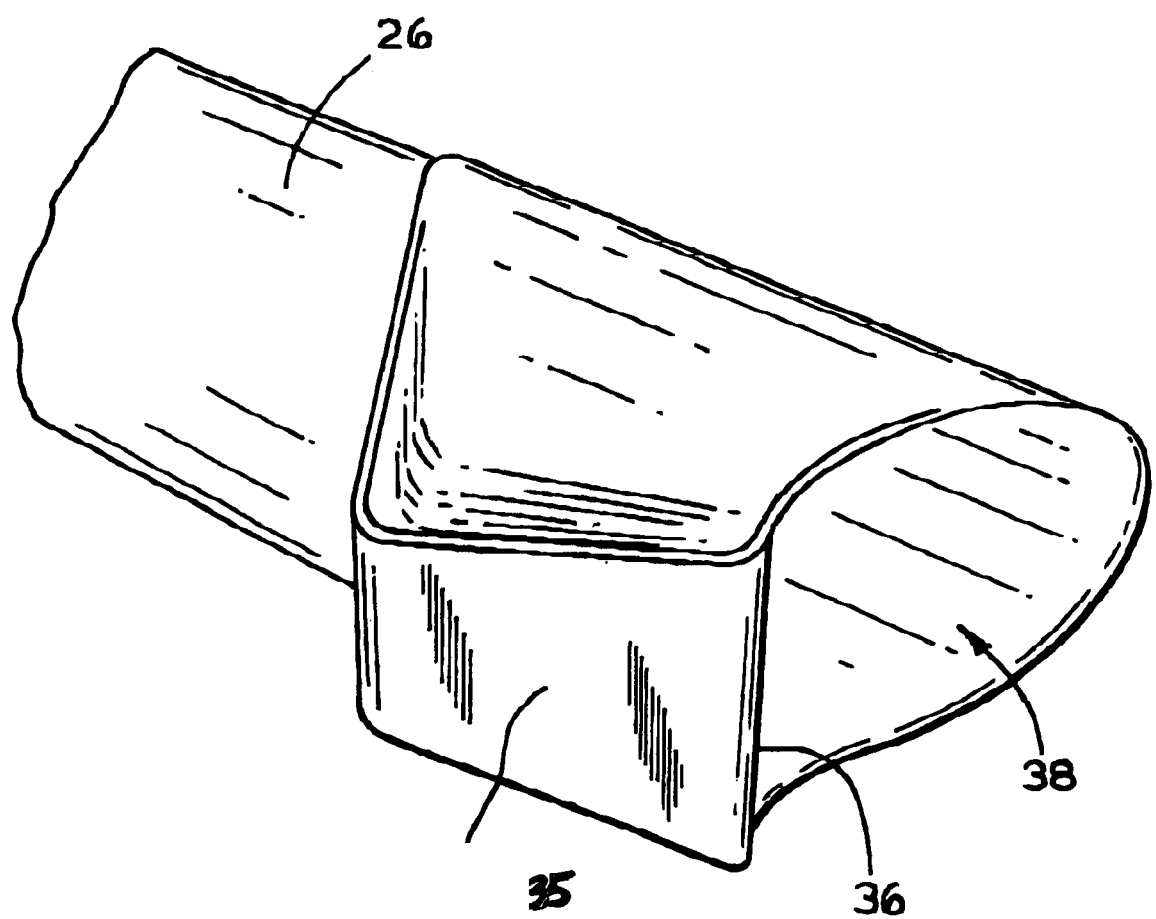
FIG. 3 is a close-up view of the end of the vacuum tube shown in FIG. 2.

Finally referring to FIG. 3, there is shown a close-up view of the end of vacuum 30 tube 26 remote from volute 22. As may be seen in FIG. 3, this end comprises a scraper 35 integrally moulded with vacuum tube 26. Scraper 35 is substantially flat and is oriented relative to the longitudinal axis of vacuum tube 26 at such an angle that when vacuum tube 26 is held as shown in FIG. 2, scraper 35 is parallel with the ground. This angle is preferably in the range of from 30 to 60 degrees. Thus if scraper 35 is brought into contact with the ground when vacuum tube 26 is held at this angle, leading edge 36 of scraper 35 helps to pick up garden waste and to direct it up the open end 38 of vacuum tube 26. This is particularly helpful in the collection of wet garden waste, which otherwise can be difficult to pick up with a blowervac by suction alone.

The invention claimed is:

1. A blower-vacuum device with both a blowing mode of operation and a vacuuming mode of operation and having dirty fan operation in the vacuuming mode thereof, comprising:
   a hand-holdable unit (10) comprising a motor having an output shaft extending outwardly of said hand-holdable unit;
   an impeller connected to said output shaft;
   a first attachment (22, 24, 26, 28) for removable engagement with the hand-holdable unit (10) in the vacuuming mode of operation and comprising both a first volute (22) for enclosing said impeller and a vacuum tube (26) in fluid communication with an inlet of said first volute;
   a second attachment (16, 18, 20) for removable engagement with the hand-holdable unit (10) in the blowing mode of operation and comprising both a second volute (16) for enclosing said impeller and a blower tube (20) in fluid communication with an outlet of said second volute;
   characterized in that:
   the first attachment further comprises a handle (24) on or proximal to said first volute (22); and
   the blower tube (20) of the second attachment is coplanar with the second volute (16).

2. A blower-vacuum device according to claim 1, wherein the second volute (16) has a smaller interior volume than the first volute (22).

3. A blower-vacuum device according to claim 1, wherein the first attachment is separable into a first portion comprising the first volute (22) and a second portion comprising at least a part of the vacuum tube (26).

4. A blower-vacuum device according to claim 1, wherein the second attachment is separable into a first portion comprising the second volute (16) and a second portion comprising at least a part of the blower tube (20).

5. A blower-vacuum device according to claim 1, wherein the first attachment comprises means (34) for scraping garden waste from the ground located at the end of the vacuum tube (26) remote from the first volute (22).

6. A blower-vacuum device according to claim 5, wherein the means for scraping garden waste from the ground comprises a scraper (34) oriented relative to the longitudinal axis of the vacuum tube (26) at an angle of from 30 to 60 degrees.

7. A blower-vacuum device according to claim 1, further comprising an air-porous receptacle (30, 32) for removable attachment to the outlet of the first volute.

\* \* \* \* \*